(12) United States Patent
Louis et al.

(10) Patent No.: US 9,321,527 B2
(45) Date of Patent: Apr. 26, 2016

(54) FREQUENCY ADAPTER AND RETURN MEANS SUITABLE FOR BEING ARRANGED IN SUCH A FREQUENCY ADAPTER

(71) Applicant: Airbus Helicopters, Marignane (FR)

(72) Inventors: Charles Louis, Aix en Provence (FR); Vincent Girard, Venelles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 14/294,518

(22) Filed: Jun. 3, 2014

(65) Prior Publication Data

US 2014/0271197 A1 Sep. 18, 2014

Related U.S. Application Data

(62) Division of application No. 12/850,694, filed on Aug. 5, 2010, now abandoned.

(30) Foreign Application Priority Data

Aug. 25, 2009 (FR) ...................................... 09 04038

(51) Int. Cl.
*B64C 27/51* (2006.01)
*F16F 1/38* (2006.01)

(52) U.S. Cl.
CPC . *B64C 27/51* (2013.01); *F16F 1/38* (2013.01); *F16F 2230/24* (2013.01)

(58) Field of Classification Search
CPC ....... B64C 27/51; B64C 27/35; F16F 1/3732; F16F 1/3735; F16F 2230/24; F16F 1/38
See application file for complete search history.

(56) References Cited

U.S. PATENT DOCUMENTS

| | | |
|---|---|---|
| 2,421,585 A | 6/1947 | Thiry |
| 2,762,600 A | 9/1956 | Mordarski et al. |
| 3,403,899 A | 10/1968 | Plume |
| 3,831,920 A | 8/1974 | Meldrum et al. |
| 4,373,862 A | 2/1983 | Ferris et al. |
| 4,531,403 A | 7/1985 | de Korompay et al. |
| 4,733,854 A | 3/1988 | Miyamoto |
| 4,883,260 A | 11/1989 | Kanda |
| 4,936,556 A | 6/1990 | Makibayashi et al. |

(Continued)

FOREIGN PATENT DOCUMENTS

| | | |
|---|---|---|
| DE | 1942853 A1 | 3/1970 |
| EP | 0500012 A1 | 8/1992 |

(Continued)

OTHER PUBLICATIONS

International Search Report and Written Opinion; International Application No. FR0904038, dated Mar. 15, 2010.

*Primary Examiner* — Xuan Lan Nguyen
(74) *Attorney, Agent, or Firm* — Brooks Kushman P.C.

(57) ABSTRACT

A frequency adapter for a rotorcraft rotor is provided. The frequency adapter has at least first and second cylinders having respective elongate first and second side walls, respectively. The second cylinder is surrounded at least in part by the first cylinder. Resilient return rings are in contact with the first and second side walls. The return rings comprise resilient first and second extreme layers each in contact with the first and second side walls. The adapter is provided with a fluid arranged in a single chamber between the first and second extreme layers.

13 Claims, 1 Drawing Sheet

(56) References Cited

U.S. PATENT DOCUMENTS

| | | |
|---|---|---|
| 5,205,710 A | 4/1993 | Engels et al. |
| 5,433,423 A | 7/1995 | Whightsil |
| 5,493,899 A | 2/1996 | Beck et al. |
| 5,501,434 A | 3/1996 | McGuire |
| 5,534,289 A | 7/1996 | Bilder et al. |
| 6,092,795 A | 7/2000 | McGuire |
| 6,676,074 B2 * | 1/2004 | Zoppitelli ............... B64C 27/35 244/17.11 |
| 2002/0153647 A1 | 10/2002 | Baudendistel et al. |

FOREIGN PATENT DOCUMENTS

| | | |
|---|---|---|
| FR | 2497073 A1 | 7/1982 |
| FR | 2672947 A1 | 8/1992 |
| FR | 2818717 A1 | 6/2002 |
| FR | 2860582 A1 | 4/2005 |
| GB | 1568455 A | 5/1980 |
| JP | 64074335 A | 3/1989 |
| WO | 9415113 A1 | 7/1994 |
| WO | 9530843 A1 | 11/1995 |

* cited by examiner

FREQUENCY ADAPTER AND RETURN MEANS SUITABLE FOR BEING ARRANGED IN SUCH A FREQUENCY ADAPTER

CROSS REFERENCE TO RELATED APPLICATION

This application is a division of U.S. application Ser. No. 12/850,694 filed Aug. 5, 2010, which claims priority to FR 09 04038 filed Aug. 25, 2009, the disclosures of which are incorporated in their entirety by reference herein.

FIELD OF THE INVENTION

The present invention relates to a frequency adapter and also to return means suitable for being arranged in such a frequency adapter.

The invention lies in the technical field of damping lead-and-lag or "drag" movements of a blade, and more particularly in the field of frequency adapters for a rotorcraft rotor.

BACKGROUND OF THE INVENTION

Conventionally, a rotorcraft rotor comprises a hub driven in rotation about an axis of rotation by a drive shaft or an outlet shaft from a main gearbox, together with at least three blades that are fastened to the hub via appropriate hinges, in particular via respective laminated spherical thrust bearings dedicated to each of the blades.

If each blade were to be fastened to a hub without being hinged, then the resulting rotor is a rigid rotor. With a rigid rotor, in hovering flight, the distribution of aerodynamic forces along a blade gives rise to a bending moment of very large magnitude at the root of the blade. In horizontal flight, the so-called "advancing" blade generates more lift than the so-called "retreating" blade because of the difference in air speeds, as explained in greater detail below.

Consequently, the resultant of the aerodynamic forces acting on a blade does not have the same value in all azimuth positions, nor does it have the same point of application: the bending moment at the root of the blade is thus large and varying, thereby generating alternating mechanical stresses, giving rise to a fatigue phenomenon that is harmful to materials. Furthermore, the resultant of the aerodynamic forces from all of the blades is no longer disposed along the drive axis of the rotor, thereby generating a roll moment, said roll moment increasing with increasing forward speed of the rotorcraft, which can make it difficult to keep the rotorcraft in equilibrium in horizontal flight.

In order to remedy those drawbacks, it is known to hinge each blade on the hub about a respective axis that is perpendicular to the drive shaft and referred to as the vertical flapping axis, which corresponds to a vertical flapping hinge that is capable of transferring lift but that can under no circumstances transfer a bending moment. Consequently, if a blade has a flapping hinge connection with the hub, then the flapping bending moment is zero at the point of attachment constituted by said flapping hinge. For the blade to be in equilibrium, centrifugal forces keep the blade extending outwards after it has risen a little so that the resultant of the lift and the centrifugal forces intersects said flapping axis, and allowing conicity $a_0$ to appear.

Under such conditions, there is no longer a large roll moment in horizontal flight and the blades no longer rotate in a plane, but rather their outer ends describe a very flat cone. In practice, the flapping axis is then no longer on the axis of rotation but is rather offset therefrom by a distance a, referred to as eccentricity.

It should also be recalled that in order to provide a helicopter with lift in its various configurations, it is necessary to be able to control the lift provided by the rotor and to vary it. That is why a pitch hinge is also provided, about an axis that is substantially parallel to the span of the corresponding blade. This new degree of freedom enables the lift of the blade to be controlled by acting on the general pitch control, and also makes it possible to vary pitch cyclically, thereby enabling the plane of rotation of the blade to be controlled, which blades then describe a cone of an axis that no longer coincides with the drive axis: the resultant of the forces applied to the hub changes direction when the plane of the rotor changes. As a result, moments are applied about the center of gravity of the helicopter, thereby making it possible for it to be piloted.

As mentioned above, the plane of rotation of the blades may be other than a plane perpendicular to the drive shaft. Under such conditions, it is necessary for each blade to be hinged in drag since the end of each blade is at a distance from the rotor shaft that varies. Otherwise, inertial forces would generate alternating bending moments in the plane of each blade, thereby generating undesirable mechanical stresses. Such a drag hinge is provided by hinging a blade about a drag axis that is substantially parallel to the rotor axis, and consequently substantially perpendicular to drag forces. To enable such a blade to be driven by the drive shaft, it is naturally necessary for the drag hinge to be far enough away from the rotor axis to ensure that the moment due to centrifugal forces balances the moment due to drag and inertial forces, thus requiring the drag axis to be offset so as to present eccentricity e, and with it being necessary for the so-called "drag" angle $\delta$ not to be too large.

Consequently, the blades of a hinged rotor of a rotary wing aircraft, in particular of a helicopter, can move in the following four ways:

I) rotation about the rotor axis;
II) pivoting about a vertical flapping axis, made possible by the vertical flapping hinge;
III) pivoting about the drag axis, also referred to as the horizontal flapping axis, made possible by the horizontal flapping hinge or drag hinge; and
IV) pivoting about the axis of the blade made possible by the pitch hinge (with this not being specific to hinged rotors).

By way of example, as described in patent FR 2 497 073, the above pivoting movements II, III, and IV may be made possible by a single member such as a laminated spherical thrust-bearing.

Nevertheless, the oscillations of each blade about its drag axis may become coupled in unstable manner with the movements or the elastic deformation modes of the airframe, in particular the oscillations of a helicopter standing on the ground via its landing gear: this gives rise to a phenomenon known as "ground resonance" that can be dangerous for the aircraft when the resonant frequency of the oscillations of the blades about their drag axes is close to one of the resonant frequencies of oscillations of the aircraft on its landing gear.

Remedies to that phenomenon consist in introducing damping on the drag axes by means of a damper type device.

Such dampers include resilient return means of determined stiffness and damping qualities for combating resonance phenomena, in particular ground resonance, and also drive train resonance that can also appear, in particular in helicopters.

When rotor blades are excited in drag, the blades depart from their equilibrium positions and may become distributed unevenly in the circumferential direction, thereby creating an unbalance by moving the center of gravity of the rotor away from its axis of rotation. Furthermore, the blades that have moved away from their equilibrium positions oscillate about those positions at a frequency $\omega_\delta$ which is the resonant frequency of the blades in drag, and more exactly of the first mode of vibration in drag, referred to more simply as drag mode.

If $\Omega$ is the frequency of rotation of the rotor, it is known that the fuselage of the helicopter is thus excited at the frequencies $|\Omega \pm \omega_\delta|$.

When standing on the ground via its landing gear, the fuselage of the helicopter constitutes a system comprising a mass suspended above the ground by a spring and a damper constituted by the landing gear. The fuselage supported by its landing gear thus has its own resonant modes of vibration in roll and in pitching. There is a risk of instability on the ground when the resonant frequency of the fuselage on its landing gear, in roll or in pitching, is close to an excitation frequency, and in particular to the frequency $|\Omega-\omega_\delta|$, which corresponds to the ground resonance phenomenon. To avoid this instability, it is known firstly to seek to avoid these frequencies crossing before the rotor reaches its nominal speed of rotation, and if they cannot be prevented from crossing, then it is necessary to damp the movements of the fuselage on its landing gear sufficiently and also to damp the blades of the main rotor in their drag movements.

Consequently, the stiffness of the drag dampers of the blades of a main rotor must be selected so that the resulting resonant frequency of the blades in drag makes it possible to avoid a potential ground resonance zone, while simultaneously having sufficient damping. When the speed of rotation of the rotor passes through the critical speed, assuming said speed is lower than the nominal speed of rotation of the rotor, and regardless of whether the speed of rotation of the rotor is speeding up or slowing down, then the movements of the blades must be damped sufficiently to avoid entry into resonance.

That is why drag dampers with resilient return means of determined stiffness are also referred to as frequency adapters.

Document FR 2 672 947 describes a frequency adapter provided with a first cylinder that is elongate and blind, i.e. an elongate external strength member extending from a closed end to an open end that opens to the outside of the external strength member. A second elongate cylinder of the strength member type is then inserted through said open end into the inside of the first cylinder.

The frequency adapter then has resilient return means arranged between the first and second cylinders, specifically an elastomer ring that is bonded to the first and second cylinders.

Similarly, document FR 2 818 717 provides first, second, and third cylinders that are interleaved in one another, with two adjacent coaxial cylinders being bonded together by an elastomer ring.

More precisely, an elastomer ring connects the inside face of a side wall of the first cylinder to the outside face of the side wall of the second cylinder. Likewise, an elastomer ring connects the inside face of a side wall of the second cylinder to the outside face of the side wall of the third cylinder.

Documents EP 0 500 012 and WO 94/15113 also describe resilient return means arranged between two cylinders.

Consequently, the state of the art provides frequency adapters that are provided at least with first and second cylinders having respective elongate first and second side walls, the second cylinder being surrounded at least in part by the first cylinder, with resilient return means being bonded to the first and second side walls.

Such frequency adapters are very effective. Nevertheless, their resilient return means deteriorate over time. This deterioration is manifested by the appearance of cracks, fissures in the elastomers, thereby reducing the effectiveness of the adapter. Depending on the severity of the deterioration, it becomes necessary to replace the adapter.

The manufacturers of frequency adapters are consequently required to establish replacement criteria based on the dimensions of the cracks that can be seen from the outside in order to determine whether it has become necessary to replace a frequency adapter.

In order to monitor the physical integrity of such return means, an operator makes use of a small ruler. That method is made difficult to implement when accessibility to the return means is poor as a result of the large number of components in their vicinity, thereby considerably lengthening the time required for measurement and maintenance.

Document FR 2 860 582 relating to elastomer members provides for placing graduations on the visible surface of an elastomer. It would appear that this teaching applicable to elastomer members is incomplete in the context of a frequency adapter since the depth of the crack is not known.

The thickness of the return means of an adapter is considerable compared with its visible area, so transposing the teaching of document FR 2 860 582 to a frequency adapter would appear to be difficult.

Document U.S. Pat. No. 5,534,289 provides for placing two layers of colored microcapsules on a structure. Like document FR 2 860 582, the information provided by the method used remains fragmented, with it being difficult to evaluate the length and the depth of a crack.

Thus, the results of devices implemented in accordance with documents FR 2 860 582 and U.S. Pat. No. 5,534,289 may be difficult to interpret without some additional operation.

Document U.S. Pat. No. 5,493,899 provides for plunging an elastomer element in a solvent and observing whether the solvent penetrates into the inside of the element.

Finally, document U.S. Pat. No. 4,531,403 provides a method of detecting cracks in a solid material by measuring permeability.

The methods of documents U.S. Pat. No. 5,493,899 and U.S. Pat. No. 4,531,403 appear clearly to be ill-adapted to a frequency adapter arranged on a rotorcraft lift rotor.

The provisions set out in technical fields that are remote from the invention, i.e. remote from frequency adapters, do not, a priori, provide solutions that are completely satisfactory.

It should be observed that documents U.S. Pat. No. 5,205,710 and GB 1 568 455 relate to a blade and as a result they are remote from the technical field of the invention.

Furthermore, document DE 1 942 853 presents return means provided with two lateral grooves.

SUMMARY OF THE INVENTION

An object of the present invention is thus to propose a frequency adapter that enables an operator to determine easily and without ambiguity whether the frequency adapter needs to be replaced, in particular without it being necessary to dismantle the frequency adapter or to use tools that are bulky and not very accurate.

According to one aspect of the invention, a frequency adapter is provided in particular both with at least first and second cylinders having respective elongate first and second side walls, the second cylinder being surrounded at least in part by the first cylinder, and with resilient return means in contact with the first and second side walls so as to be capable of being stressed by the first cylinder and the second cylinder.

The return means may optionally:
adhere to the first and second side walls;
be compressed between the first and second side walls; or
be arranged between two shoulders of the first wall and two shoulders of the second wall.

This frequency adapter is remarkable in that the return means comprise first and second resilient extreme layers each in contact with the first and second side walls, the adapter being provided with a fluid arranged in a single chamber between the first and second extreme layers so as to be suitable for escaping from the adapter in the event of at least one extreme layer presenting a crack requiring it to be replaced.

Thus, a fluid is located between the first and second cylinders and between the first and second extreme layers.

In the event of a crack appearing having a predetermined dimension in the first or second extreme layer, the fluid will escape via said crack. An operator observing this fluid then understands that the crack has reached a critical size, which means that the deteriorated frequency adapter needs to be replaced.

The frequency adapter may also include one or more of the following additional characteristics.

Under such circumstances, the fluid is advantageously a colored liquid, thereby making it easily identified by an operator in the event of a crack appearing that passes through the first extreme layer or the second extreme layer. As a variant, the fluid may be a gas under pressure.

When the fluid is a liquid, the liquid escapes by capillarity.

When the fluid is a gas, it has a pressure that is sufficiently different from atmospheric pressure.

Optionally, the frequency adapter may include a sensor for sensing the pressure of said fluid. A drop in the fluid pressure is then indicative of a leak, and thus of the presence of a large crack.

Furthermore, the first cylinder is blind having a first side wall extending longitudinally from a first base that is open to an external medium to a second base that is closed by a plug, the first extreme layer of the return means facing the external medium and the second extreme layer of the return means facing the plug, a first longitudinal dimension of the first extreme layer being shorter than a second longitudinal dimension of the second extreme layer.

Between its first and second cylinders, and starting from the external medium and moving along an axis parallel to the longitudinal axis of the first and second cylinders, the frequency adapter comprises in succession: the first extreme layer; said fluid; and the second extreme layer.

Since the first dimension is shorter than the second dimension, a first crack passing longitudinally through the first layer will occur before a second crack passing longitudinally through the second layer, since the first distance to be traveled by the first crack is thus shorter than the second distance to be traveled by the second crack for this purpose.

Since the first extreme layer opens to the external medium so as to be apparent, i.e. visible to an operator, an operator can thus easily see when fluid has leaked from the frequency adapter.

In a first embodiment, the first and second extreme layers are distinct, these first and second extreme layers comprising two distinct blocks of material that are separated by a fluid.

Conversely, in a second embodiment, the return means include an intermediate layer between said first and second extreme layers, the intermediate layer including a cavity constituting the single chamber in which said fluid is located.

The first and second extreme layers and the intermediate layer thus form a single block of elastic material within which a fluid is held, the first and second extreme layers representing the extreme bases of the block of elastic material.

In the first embodiment, the two distinct blocks of elastic material are separated by a fluid, whereas in the second embodiment, a fluid is contained within an intermediate portion of a single block of elastic material.

Advantageously, the intermediate layer has a first resilient ring secured to the first and second extreme layers and in contact with the first cylinder, the intermediate layer also having a resilient second ring secured to the first and second extreme layers and in contact with the second cylinder, the cavity having the shape of a central ring and extending between the first and second extreme layers and between the first and second rings.

In addition to the above-described frequency adapter, the concept of the invention is implemented in return means suitable for being arranged between first and second cylinders of a frequency adapter. These return means are remarkable in that they comprise a single block of material provided with first and second extreme layers interconnected by an intermediate layer, the intermediate layer including a cavity filled with a fluid, and said cavity thus forming a single chamber containing said fluid.

In addition, the return means include a hollow central portion. Thus, it is possible to arrange it in a first cylinder of a frequency adapter and to arrange a second cylinder of said frequency adapter in the hollow central portion.

BRIEF DESCRIPTION OF THE DRAWINGS

The invention and its advantages appear in greater detail in the context of the following description of embodiments given by way of example with reference to the accompanying figures, in which.

Elements that are present in more than one of the figures are given the same references in each of them.

DETAILED DESCRIPTION

The figures also show three directions X, Y, and Z.

The directions X and Y are referred to as first and second transverse directions.

Conversely, the direction Z is referred to as a longitudinal direction insofar as the elements shown stretch in this longitudinal direction. Furthermore, the term "thickness" relates to dimensions in this longitudinal direction Z.

Figure 1:
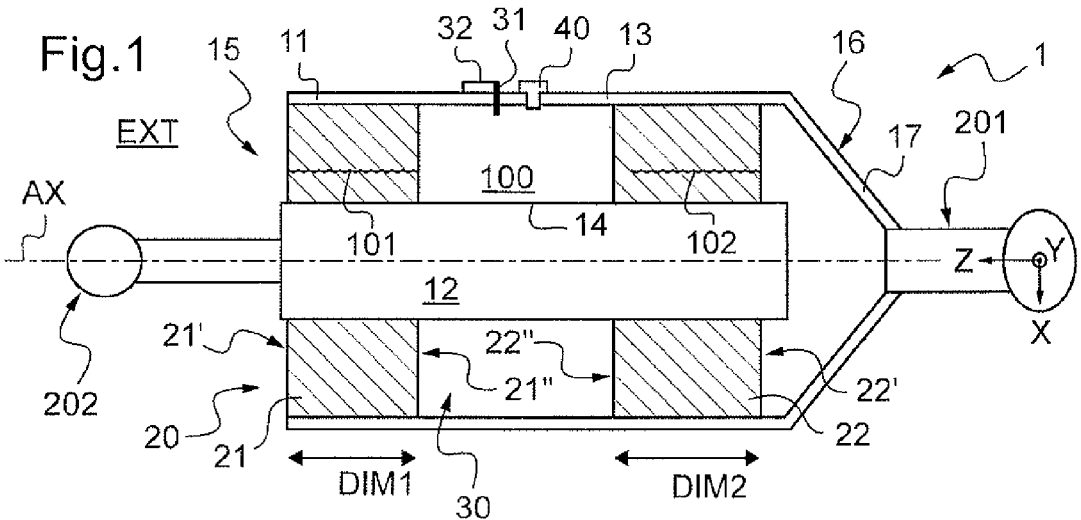
FIG. 1 shows a frequency adapter in a preferred first embodiment.
Figure 2:
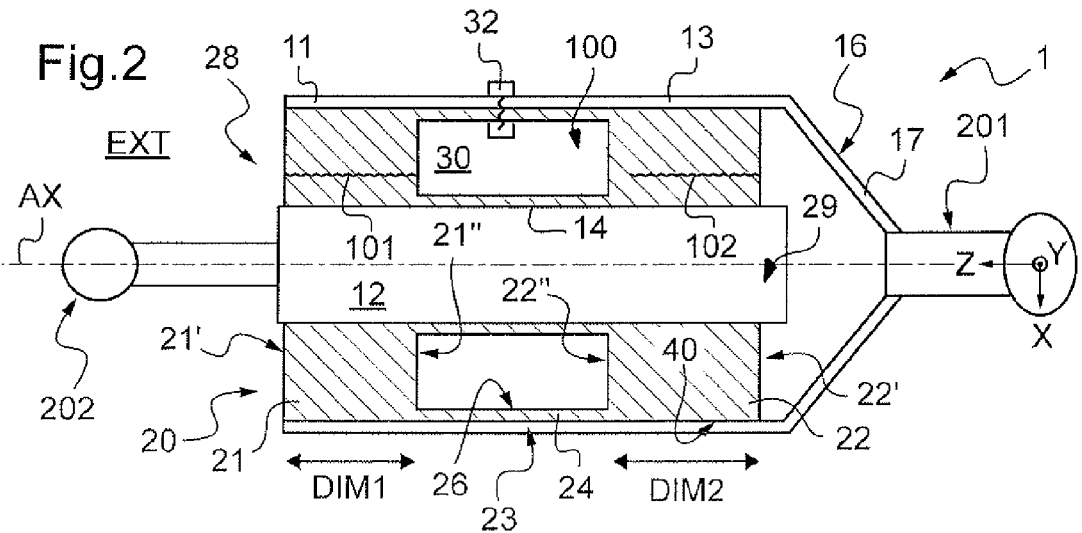
FIG. 2 shows a frequency adapter in a second embodiment.

FIGS. 1 and 2 show a frequency adapter 1 of the invention.

The frequency adapter 1 comprises a first cylinder 11 having a first side wall 13 extending longitudinally from a first base 15 towards a second base 16. The first cylinder 11 shown in FIGS. 1 and 2 is a hollow cylinder defined by its first side wall 13, the longitudinal axis AX along which the first cylinder extends representing the axis of symmetry of the first side wall 13. It should be observed that the longitudinal axis AX extends along the longitudinal direction Z.

Furthermore, the first base 15 of the first cylinder 11 opens to an external medium EXT, while the second base 16 is closed by a conical plug 17. The plug 17 and the first side wall 13 form a single part in the configuration shown. Under such circumstances, the first cylinder 11 is blind, the first cylinder opening to the external medium solely via its first base.

Finally, it should be observed that the plug 17 includes first fastener means 201 for fastening to a blade of a rotorcraft lift rotor, for example.

In addition, the frequency adapter 1 has a second cylinder 12 with a second side wall 14 extending longitudinally. The second cylinder 12 shown in FIGS. 1 and 2 is a solid cylinder defined by its second side wall 14, the longitudinal axis AX along which the first cylinder extends also representing the axis of symmetry of the second side wall 14.

The second cylinder 12 is arranged at least in part inside the first cylinder 11. More particularly, the second cylinder 12 is arranged completely inside the first cylinder 11 in the configuration shown, with the first and second cylinders having a longitudinal axis AX of symmetry in common.

Furthermore, level with the first base 15 of the first cylinder 11, the second cylinder is provided with second fastener means 202 suitable for fastening to a blade or to the hub of a rotorcraft lift rotor, for example.

Furthermore, the frequency adapter 1 possesses resilient return means 20 in contact firstly with the first side wall 13 of the first cylinder 11 and secondly with the second side wall 14 of the second cylinder 12. For example, the resilient return means 20 adhere both to the first side wall 13 of the first cylinder 11 and to the second side wall 14 of the second cylinder 12.

By moving the first cylinder 11 relative to the second cylinder 12 along the longitudinal axis AX, and vice versa, the resilient return means 20 are stressed in shear, thereby acting as a damper.

Independently of the embodiment, the return means comprise first and second extreme layers 21 and 22 of a material constituting an elastomer, e.g. selected for its elastic and/or damping properties.

Consequently, the first extreme layer 21 adheres close to the first base 15 to the first and second cylinders 11 and 12, and more specifically to the first and second side walls 13 and 14. At the opposite end, the second extreme layer 22 adheres close to the second base 16 to the first and second cylinders 11 and 12, and more specifically to the first and second side walls 13 and 14.

The first and second extreme layers 21 and 22 are in the form of rings both having the second cylinder 12 passing therethrough, and both being surrounded by the first side wall 13 of the first cylinder 11.

Advantageously, a fluid 30 is then located in a single chamber 100 between the first and second extreme layers 21 and 22 and between the first and second side walls 13 and 14.

Thus, a first external face 21' of the first extreme layer 21 faces the first base 15 and thus the external medium EXT, while a first internal face 21" of the first extreme layer 21 faces at least the fluid 30. Similarly, a second external face 22' of the second extreme layer 22 faces the second base 16 and thus the plug 17, while a second internal face 22" of the second extreme layer 22 faces at least the fluid 30.

The fluid 30 may be a colored liquid or indeed a gas, for example.

If a crack passes longitudinally through one of the extreme layers 21 or 22 in its thickness direction, going from the external face 21', 22' to the internal face 21", 22" of said extreme layer 21, 22, and thus reaching said single chamber 100, then the fluid 30 can escape from its housing via the through crack.

In a variant, the fluid is a colored liquid, so the appearance of this colored liquid informs an operator that an extreme layer 21, 22 of the return means 20 has a crack passing through it. The operator then immediately replaces the faulty frequency adapter 1.

Thus, if the crack is a first crack 101 appearing in the first extreme layer 21, it will be understood that the colored liquid will reach the first external face 21' of said first extreme layer 21. This first external face 21' of the first extreme layer 21 faces the external medium EXT, so the operator can observe the presence of said colored liquid visually and without effort.

However, if the crack is a second crack 102 appearing in the second extreme layer 22, the colored liquid will reach the second external face 22' of said second extreme layer 22. This second external face 22' of the second extreme layer 22 faces the plug 17 so, a priori, the operator will not observe the presence of said colored liquid visually. Thus, the plug 17 is advantageously provided with inspection orifices enabling the operator to observer the second external face 22' of the second extreme layer 22.

In order to avoid using such a plug 17 provided with inspection orifices, for the first extreme layer 21 having a first longitudinal dimension DIM1 and thus a first thickness from its first external face 21' to its first internal face 21", and for the second extreme layer 22 having a second longitudinal dimension DIM2 and thus a second thickness from its second external face 22' to its second internal face 22", the first dimension DIM1 is made to be shorter than the second dimension DIM2.

Thus, the first extreme layer 21 facing a medium EXT that is external to the frequency adapter 1, and that is thus easily visible to an operator, has a first longitudinal dimension DIM1 that is shorter than the second longitudinal dimension DIM2 of the second extreme layer 22.

Under such circumstances, a first crack 101 will pass through the first extreme layer 21 before a second crack 102 passes through the second extreme layer 22.

The invention thus enables an operator to know when it is necessary to replace a frequency adapter without it being necessary to use any instrument, not even a ruler for measuring purposes.

In another variant, the fluid 30 is a liquid or a gas under pressure.

The escape of the fluid can then be observed visually, the liquid or gas possibly being colored, or it may be detectable by touch. Under such circumstances, by placing a hand on a crack, an operator can feel the presence of the liquid or the pressure of the gas of the fluid 30.

In order to inspect an extreme layer that is not directly visible from the external medium EXT, it is possible to use a plug that is pierced or indeed a first extreme layer 11 for which the first longitudinal dimension DIM1 is shorter than the second longitudinal dimension DIM2 of the second extreme layer 12.

Like the configuration shown in FIG. 1, the frequency adapter 1 may be provided with a pressure sensor 31 that is connected to a display screen 32 in order to display the pressure of the fluid 30.

Under such circumstances, a drop in this pressure means that the first and/or second extreme layer 21, 22 possesses a through crack, i.e. a crack interconnecting the external face of an extreme layer with its internal face.

In the first embodiment shown in FIG. 1, the first and second extreme layers 21 and 22 constitute two distinct blocks of material. The first internal face 21" of the first extreme layer 21 is not connected to the second internal face 22" of the second extreme layer 22 by a layer of elastic material.

The first and second extreme layers 21 and 22 form two distinct entities that can be handled separately, naturally before they are positioned against, and even fastened, to the first and second side walls 13 and 14.

In order to fill the space 30 situated in the sole chamber 100 between the first and second extreme layers 21, 22 and between the first and second side walls 13, 14 with fluid, a filler orifice is provided that is closed by conventional means 40.

Figure 3:
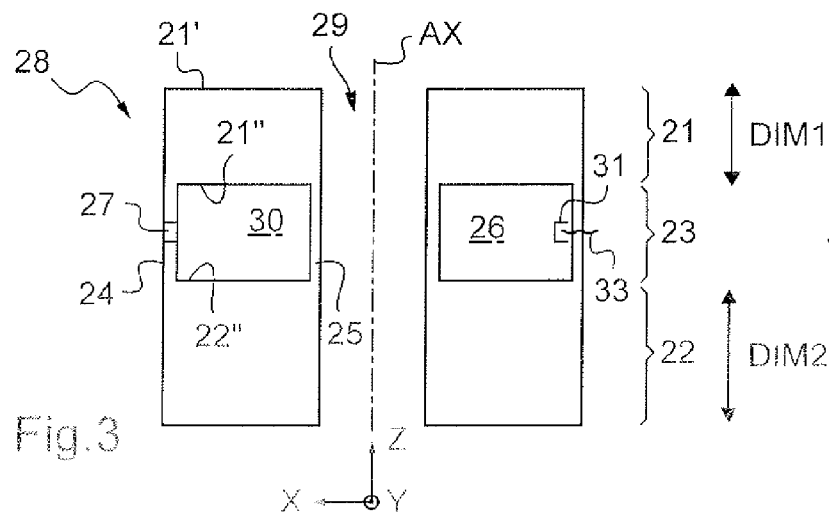
FIG. 3 shows return means of the invention.

With reference to FIGS. 2 and 3, in a second embodiment, the return means 20 of the frequency adapter comprise a single block 28 of material of the invention provided with a fluid 30 between first and second extreme layers 21, 22.

More precisely, with reference to FIG. 3, the single block 28 comprises in succession along a longitudinal axis AX: a first extreme layer 21; an intermediate layer 23; and a second extreme layer 22. The first and second extreme layers 21 and 22 and the intermediate layer 23 are thus inseparable, unlike the first embodiment. Furthermore, in order to be able to surround a cylinder of a frequency adapter, the single block 28 has a longitudinal bore 29 passing along the longitudinal axis AX in succession through the first extreme layer 21, the intermediate layer 23, and the second extreme layer 22.

Furthermore, the first extreme layer 21 extends longitudinally from a first external face 21' facing externally relative to said single block 28 to a first internal face 21" facing the intermediate layer. A first dimension DIM1 then extends between the first external face 21' and the first internal face 21".

Similarly, the second extreme layer 22 extends longitudinally from a second external face 22' facing externally relative to said single block 28 to a second internal face 22" facing the intermediate layer. A second dimension DIM2 then extends between the second external face 21' and the second internal face 21".

The first dimension DIM1 is then advantageously shorter than the second dimension DIM2.

Furthermore, the intermediate layer 23 has a cavity 26 forming a single chamber 100 in which a fluid 30 is arranged, e.g. a liquid or gas that is colored and/or at a predetermined pressure. For this purpose, it is possible to envisage making a local opening 27 and to reclose this local opening once the cavity 26 has been filled.

The intermediate layer 23 comprises a resilient first ring 24 secured to the first and second extreme layers 21 and 22 and suitable for being pressed against or bonded to a first cylinder 11 surrounding the single block 28, the intermediate layer 23 having a resilient second ring 25 secured to the first and second extreme layers 21 and 22 and suitable for being pressed against or bonded to a second cylinder 12 surrounded by the sole block 28, and the cavity 26 is in the form of a central ring extending between the first and second extreme layers 21 and 22 and between said first and second rings 24 and 25.

It should also be observed that it is possible to insert a pressure sensor 31 inside the cavity 26, the pressure sensor being provided with a connection cable 33 leading to a display screen 32. Care should then be taken to ensure the connection cable 33 projects out from the single block 28.

With reference to FIG. 2, the single block 28 is placed between the first and second cylinders 11, 12 of a frequency adapter of the above-described type.

Thus, the second cylinder 12 is placed inside the longitudinal bore 29 in the single block 28, and the peripheral wall 30 of the single block 28 is bonded to the first cylinder 11 and to the second cylinder 12, by adhesive or by compressing the single block 28 between the first and second cylinders, for example.

Care is then taken to place the first external face 21' of the first extreme layer 21 level with the first base 15 and thus facing the external medium EXT. Consequently, the second external face 22' of the second extreme layer 22 faces the second base 16, and thus the plug 17.

Naturally, the present invention may be subjected to numerous variations as to its implementation. Although several embodiments are described above, it will be readily be understood that it is not conceivable to identify exhaustively all possible embodiments. It is naturally possible to envisage replacing any of the means described by equivalent means without going beyond the ambit of the present invention.

For example, it should be observed that the cylinders need not be right-circular cylinders and/or that each cylinder may have a plurality of members without going beyond the invention. Under such circumstances, the first cylinder may optionally be provided with at least one external sheath and with an external strength member extended by a plug. Similarly, the second cylinder may optionally be provided with at least one internal sheath and with an internal strength member.

The resilient means are then secured to the internal and external sheaths, e.g. by vulcanization, and then the return means are inserted between the internal and external strength members.

More precisely, in the first embodiment, the first extreme layer is bonded to the first internal sheath and the first external sheath while the second extreme layer is bonded to the first internal sheath and to the first external sheath.

In the second embodiment, a single internal sheath and a single external sheath are sufficient. Thus, the first and second extreme layers are bonded to these single internal and external sheaths. Similarly, the intermediate layer is bonded to these single internal and external sheaths respectively via its first and second rings.

What is claimed is:

1. A rotor aircraft comprising:
a rotator hub;
a rotor having a plurality of rotor blades connected to the rotor hub;
a frequency adapter connected between the rotating hub and at least one of the purality of rotor blades, the frequency adapter including:
a first elongate cylinder, attached to one of a rotating hub and the rotor blade, wherein the first cylinder has at least one end open and a second end closed by a plug;
a second elongate cylinder attached to the other of the rotating hub and the rotor blade and arranged concentrically within first cylinder;
first and second resilient rings disposed between the first and second cylinders, wherein the first and second resilient rings have a dampening stiffness adapted to absorb frequency vibrations from the second cylinder and thereby minimize transmission of the vibrations to the first cylinder;
a single closed fluid chamber defined between the first and second cylinder and the first and second resilient rings, wherein the single closed fluid chamber is not in fluid communication with another chamber defined between the first and second cylinders; and
an indicator liquid disposed in the single fluid chamber, wherein the liquid is capable of indicating at least one of the resilient rings having a crack that requires the adapter to be replaced,
wherein the liquid includes an indicator color being visually distinguishable in contrast to a color of the rotor aircraft and detectable when the liquid having the indicator color escapes through the open end and is located outside of the frequency adapter thereby indicating the crack in one of the resilient rings requires the frequency adapter to be replaced.

2. The rotor aircraft according to claim 1, wherein the second resilient ring being adjacent to the plug, a first longitudinal dimension of the first resilient ring being shorter than a second longitudinal dimension of the second resilient ring.

3. The rotor aircraft according to claim 1, further comprising an intermediate layer between the first and second resilient rings, the intermediate layer including a cavity including the single chamber in which the liquid is located.

4. The rotor aircraft according to claim 1, wherein a second chamber is defined between the plug and one of the first and second resilient rings that contains a second fluid being different from the indicator liquid.

5. The rotor aircraft according to claim 4, wherein the second fluid comprises a gas.

6. A rotor aircraft comprising:
a rotator hub;
a rotor having a plurality of rotor blades connected to the rotor hub;
a frequency adapter connected between the rotating hub and at least one of the plurality of rotor blades, the frequency adapter including:
at least a first cylinder and a second cylinder each having respective elongate first and second side walls, the second cylinder being surrounded at least in part by the first cylinder, wherein the first cylinder is a blind cylinder having a first open end and a second closed end;
a first extreme layer and a second extreme layer each defining resilient rings being disposed between the first and second side walls so as to be capable of being stressed by the first cylinder and the second cylinder, each of the first and second extreme layers in contact with the first and second side walls, the first extreme layer adjacent the first open end and the second extreme layer is spaced apart from the first extreme layer and disposed adjacent the second closed end;
a single chamber defined between the first and second side walls and between the first and second extreme layers; and
an indicator liquid sealed in the single chamber such that the liquid is not in fluid communication with another chamber,
wherein the first extreme layer has a first longitudinal dimension of being shorter than a second longitudinal dimension of the second extreme layer so that a crack extends through the first extreme layer before the crack extends through the second extreme layer, the indicator liquid thereby escaping through the crack and through the open end of the first cylinder and indicating at least one of the extreme layers having the crack that requires the adapter to be replaced.

7. The rotor aircraft according to claim 6, wherein the first open end is open to an external medium and the second closed end is closed by a plug and the second extreme layer adjacent to the plug.

8. The rotor aircraft according to claim 6, wherein further comprising an intermediate layer between the first and second extreme layers, the intermediate layer including a cavity including the single chamber in which the liquid is located.

9. The rotor aircraft according to claim 8, wherein the intermediate layer defines an additional resilient first ring secured to the first and second extreme layers and in contact with the first cylinder, the cavity having a shape of a central ring and extending between the first and second extreme layers.

10. The rotor aircraft according to claim 6, wherein the each of the first and second extreme layers are arranged between the first and second cylinders and each of the first and second extreme layers include a single block of material and are spaced apart by an intermediate layer, the intermediate layer including a cavity filled with the liquid.

11. The rotor aircraft according to claim 6, wherein the indicator liquid comprises a colored liquid being visually detectable to indicate a crack in one of the extreme layers that requires the adapter to be changed.

12. The rotor aircraft according to claim 6, wherein a second chamber is defined between the closed end of the first cylinder and one of the first and second extreme layers, wherein the second chamber contains a second fluid being different from the indicator liquid.

13. The rotor aircraft according to claim 6, wherein the second fluid comprises a gas.

* * * * *